United States Patent
Chen et al.

(10) Patent No.: US 10,277,361 B2
(45) Date of Patent: *Apr. 30, 2019

(54) METHOD, APPARATUS AND SYSTEM FOR TRANSMITTING INFORMATION BITS

(71) Applicant: HUAWEI TECHNOLOGIES CO., LTD., Shenzhen, Guangdong (CN)

(72) Inventors: Xiaofeng Chen, Shenzhen (CN); Yongxia Lv, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,980

(22) Filed: Sep. 27, 2018

(65) Prior Publication Data

US 2019/0028240 A1 Jan. 24, 2019

Related U.S. Application Data

(63) Continuation of application No. 15/837,861, filed on Dec. 11, 2017, now Pat. No. 10,090,968, which is a
(Continued)

(30) Foreign Application Priority Data

Sep. 8, 2010 (CN) .......................... 2010 1 0283778

(51) Int. Cl.
*H04L 27/10* (2006.01)
*H04L 1/00* (2006.01)
(Continued)

(52) U.S. Cl.
CPC .......... *H04L 1/0071* (2013.01); *H04L 1/0031* (2013.01); *H04L 1/0073* (2013.01);
(Continued)

(58) Field of Classification Search
CPC .................................................. H04L 27/2633
(Continued)

(56) References Cited

U.S. PATENT DOCUMENTS 5,493,586 A * 2/1996 Brownlie ............ H04L 27/3411
375/261
6,473,467 B1 * 10/2002 Wallace ............... H04B 7/0417
375/267
(Continued)

FOREIGN PATENT DOCUMENTS

CN        1448015 A      10/2003
CN     101009785 A      8/2007
(Continued)

OTHER PUBLICATIONS

3GPP TSG RAN WG1 Meeting #58bis R1-093829, "Channel coding improvement for CQI on PUCCH", Huawei, Oct. 12-16, 2009, total 7 pages.
(Continued)

*Primary Examiner* — James M Perez
(74) *Attorney, Agent, or Firm* — Huawei Technologies Co., Ltd.

(57) ABSTRACT

A method, an apparatus, and a system for transmitting information bits, where the method for transmitting information bits includes: dividing the information bits to be transmitted into at least two groups; encoding the information bits to be transmitted in each group; modulating the coded bits obtained by the encoding to obtain modulation symbols, in which each modulation symbol is obtained by using the modulation of the coded bits in the same group; and mapping and transmitting the modulation symbols. In this way, the receiving end easily reduces the algorithm complexity, thereby ensuring the performance of the receiving end.

12 Claims, 8 Drawing Sheets

Related U.S. Application Data continuation of application No. 15/264,891, filed on Sep. 14, 2016, now Pat. No. 9,853,773, which is a continuation of application No. 14/445,321, filed on Jul. 29, 2014, now Pat. No. 9,461,775, which is a continuation of application No. 13/104,339, filed on May 10, 2011, now Pat. No. 8,831,129, which is a continuation of application No. PCT/CN2011/072364, filed on Mar. 31, 2011.

(51) Int. Cl.
    *H04L 27/34*     (2006.01)
    *H04L 27/26*     (2006.01)
    *H04L 27/36*     (2006.01)
    *H04L 1/16*     (2006.01)

(52) U.S. Cl.
    CPC ........ H04L 1/1671 (2013.01); H04L 27/2633 (2013.01); H04L 27/2636 (2013.01); H04L 27/34 (2013.01); H04L 27/362 (2013.01)

(58) Field of Classification Search
    USPC ................ 375/130, 259–261, 267, 268, 271,
                          375/279–281, 284–285, 295–296,
                        375/298–300, 302, 308, 316, 320, 322,
                            375/324–325, 329, 331–332, 340,
                                      375/346–347, 349
    See application file for complete search history.

(56) References Cited

U.S. PATENT DOCUMENTS

| | | | | |
|---|---|---|---|---|
| 6,735,180 | B1* | 5/2004 | Malkamaki | H04L 1/0025 370/282 |
| 6,771,706 | B2* | 8/2004 | Ling | H04B 7/0417 375/260 |
| 7,002,900 | B2* | 2/2006 | Walton | H04B 7/0669 370/208 |
| 7,058,079 | B1* | 6/2006 | Gicquel | H04B 3/20 370/329 |
| 7,072,413 | B2* | 7/2006 | Walton | H04B 7/0417 370/329 |
| 7,126,928 | B2* | 10/2006 | Tiedemann, Jr. | H04L 1/0002 370/329 |
| 7,313,190 | B2* | 12/2007 | Balakrishnan | H03M 13/2707 375/260 |
| 7,523,382 | B2* | 4/2009 | Kim | H03M 13/271 714/755 |
| 7,649,954 | B2* | 1/2010 | Walton | H04B 7/0417 370/204 |
| 7,664,193 | B2* | 2/2010 | Jalali | H04L 5/023 375/267 |
| 7,929,407 | B2* | 4/2011 | Ma | H04L 1/0003 370/203 |
| 8,009,758 | B2* | 8/2011 | Kwon | H04L 1/0071 375/260 |
| RE42,744 | E* | 9/2011 | Malkamaki | H04L 1/0025 370/282 |
| 8,068,548 | B1* | 11/2011 | Chen | H04L 1/0031 375/261 |
| 8,085,866 | B2* | 12/2011 | Yoshii | H04L 1/0066 375/260 |
| 8,249,006 | B2* | 8/2012 | Qu | H04B 7/022 370/329 |
| 8,320,496 | B2* | 11/2012 | Li | H03M 13/136 375/259 |
| 8,355,666 | B2* | 1/2013 | Rajkotia | H04K 3/224 455/1 |
| 8,416,885 | B2* | 4/2013 | Suo | H04B 7/0617 370/203 |
| 8,473,301 | B2* | 6/2013 | Chen | G10L 21/038 704/262 |
| 8,619,896 | B2* | 12/2013 | Chen | H04L 1/0031 375/284 |
| 8,831,129 | B2* | 9/2014 | Chen | H04L 1/0031 375/284 |
| 9,148,878 | B2* | 9/2015 | Guan | H04L 1/0006 |
| 9,461,775 | B2* | 10/2016 | Chen | H04L 1/0031 |
| 9,853,773 | B2* | 12/2017 | Chen | H04L 1/0031 |
| 10,090,968 | B2* | 10/2018 | Chen | H04L 1/0031 |
| 2002/0009157 | A1* | 1/2002 | Sipola | H04L 1/0069 375/295 |
| 2003/0043928 | A1* | 3/2003 | Ling | H04B 7/0417 375/267 |
| 2003/0112880 | A1* | 6/2003 | Walton | H04B 7/0417 375/260 |
| 2004/0082356 | A1* | 4/2004 | Walton | H04B 7/022 455/522 |
| 2005/0058089 | A1* | 3/2005 | Vijayan | H04B 7/12 370/312 |
| 2005/0107036 | A1* | 5/2005 | Song | H04L 1/0009 455/23 |
| 2005/0135308 | A1* | 6/2005 | Vijayan | H04L 5/0007 370/330 |
| 2005/0160347 | A1* | 7/2005 | Kim | H03M 13/271 714/776 |
| 2005/0216821 | A1* | 9/2005 | Harada | H03M 13/1102 714/801 |
| 2006/0088007 | A1* | 4/2006 | Jalali | H04L 5/023 370/334 |
| 2006/0195752 | A1* | 8/2006 | Walker | H04L 1/0045 714/748 |
| 2007/0019753 | A1* | 1/2007 | Kim | H03M 13/25 375/260 |
| 2007/0165729 | A1* | 7/2007 | Ha | H04L 1/0065 375/260 |
| 2008/0186843 | A1* | 8/2008 | Ma | H04L 1/0003 370/210 |
| 2008/0287155 | A1* | 11/2008 | Xu | H04L 5/0007 455/522 |
| 2008/0301536 | A1* | 12/2008 | Shin | H04L 1/0043 714/786 |
| 2008/0310526 | A1* | 12/2008 | Maltsev | H04L 27/2628 375/260 |
| 2008/0317146 | A1* | 12/2008 | Kwon | H04L 1/0071 375/260 |
| 2009/0086849 | A1* | 4/2009 | Tsai | H04L 1/1819 375/298 |
| 2009/0113274 | A1* | 4/2009 | Lee | H03M 13/27 714/776 |
| 2009/0219911 | A1* | 9/2009 | Blankenship | H04L 1/0042 370/345 |
| 2009/0225894 | A1* | 9/2009 | Yoshii | H04L 1/0066 375/295 |
| 2009/0296850 | A1* | 12/2009 | Xu | H03M 13/136 375/295 |
| 2010/0008438 | A1* | 1/2010 | Kao | H04L 1/0041 375/261 |
| 2010/0027704 | A1* | 2/2010 | Ho | H04L 1/0041 375/267 |
| 2010/0054358 | A1* | 3/2010 | Ko | H04B 7/0639 375/267 |
| 2010/0062705 | A1* | 3/2010 | Rajkotia | H04K 3/224 455/1 |
| 2010/0172433 | A1* | 7/2010 | Li | H03M 13/136 375/295 |
| 2010/0246712 | A1* | 9/2010 | Suo | H04B 7/0617 375/295 |
| 2010/0287452 | A1* | 11/2010 | Xu | H04L 1/1835 714/786 |
| 2010/0296603 | A1* | 11/2010 | Lee | H04L 1/0071 375/295 |
| 2010/0303016 | A1* | 12/2010 | Jin | H04L 27/0008 370/328 |
| 2011/0033004 | A1* | 2/2011 | Wang | H04L 27/2626 375/261 |
| 2011/0194551 | A1* | 8/2011 | Lee | H04B 7/0626 370/342 |

(56) References Cited

U.S. PATENT DOCUMENTS

| | | | | |
|---|---|---|---|---|
| 2012/0002657 | A1* | 1/2012 | Seyama | H04L 1/1854 370/338 |
| 2012/0051307 | A1* | 3/2012 | Huang | H04L 5/0007 370/329 |
| 2012/0057647 | A1* | 3/2012 | Chen | H04L 1/0031 375/295 |
| 2012/0076043 | A1* | 3/2012 | Nishio | H04L 1/1861 370/252 |
| 2012/0195282 | A1* | 8/2012 | Choi | H04L 5/0007 370/329 |
| 2012/0263156 | A1* | 10/2012 | Abraham | H04L 5/0023 370/338 |
| 2012/0320951 | A1* | 12/2012 | Han | H04L 1/0041 375/141 |
| 2013/0145239 | A1* | 6/2013 | Pi | H04L 1/0003 714/807 |
| 2013/0148614 | A1* | 6/2013 | Noh | H04L 5/001 370/329 |
| 2013/0155832 | A1* | 6/2013 | Yang | H04L 1/0026 370/203 |
| 2014/0334563 | A1* | 11/2014 | Chen | H04L 1/0031 375/260 |
| 2017/0005754 | A1* | 1/2017 | Chen | H04L 1/0031 |
| 2018/0102875 | A1* | 4/2018 | Chen | H04L 1/0031 |

FOREIGN PATENT DOCUMENTS

| | | |
|---|---|---|
| CN | 101227233 A | 7/2008 |
| CN | 101335002 A | 12/2008 |
| CN | 101431357 A | 5/2009 |
| CN | 101478335 A | 7/2009 |
| CN | 101616116 A | 12/2009 |
| CN | 101771418 A | 7/2010 |
| CN | 101820408 A | 9/2010 |
| CN | 102546119 A | 7/2012 |
| KR | 20080110441 A | 12/2008 |
| RU | 2321951 C2 | 4/2008 |
| RU | 2354079 C2 | 4/2009 |
| WO | 0203600 A1 | 1/2002 |
| WO | 0205506 A2 | 1/2002 |
| WO | 2006000991 A1 | 1/2006 |
| WO | 2008147157 A1 | 12/2008 |
| WO | 2008153330 A1 | 12/2008 |
| WO | 2009113792 A1 | 9/2009 |
| WO | 2009134913 A1 | 11/2009 |
| WO | 2011150760 A1 | 12/2011 |

OTHER PUBLICATIONS

3GPP TSG RAN WG1 Meeting #62 R1-104671, "Details for A/N transmission based on DFT-s-OFDM", ZTE, Aug. 23-27, 2010, total 8 pages.

3GPP TSG RAN WG1 #62 R1-104757, "Details on DFT-S-OFDM format for CA PUCCH", LG Electronics, Aug. 23-27, 2010, total 4 pages.

TSG-RAN WG1 Meeting #61bis R1-104140, "ACK/NAK Multiplexing Simulation Assumptions in Rel-10", Jun. 28-Jul. 2, 2010, total 25 pages.

3GPP TS 36.212 V9.2.0, 3rd Generation Partnership Project; Technical Specification Group Radio Access Network; Evolved Universal Terrestrial Radio Access (E-UTRA); Multiplexing and channel coding (Release 9), Jun. 2010, total 51 pages.

3GPP TS 36.211 V9.1.0, 3rd Generation Partnership Project; Technical Specification Group Radio Access Network; Evolved Universal Terrestrial Radio Access (E-UTRA); Physical Channels and Modulation (Release 9), Mar. 2010, total 85 pages.

* cited by examiner

METHOD, APPARATUS AND SYSTEM FOR TRANSMITTING INFORMATION BITS

CROSS-REFERENCE TO RELATED APPLICATIONS

This application is a continuation of U.S. patent application Ser. No. 15/837,861, filed on Dec. 11, 2017, which is a continuation of U.S. patent application Ser. No. 15/264,891, filed on Sep. 14, 2016, now U.S. Pat. No. 9,853,773, which is a continuation of U.S. patent application Ser. No. 14/445,321, filed on Jul. 29, 2014, now U.S. Pat. No. 9,461,775, which is a continuation of U.S. patent application Ser. No. 13/104,339, filed on May 10, 2011, now U.S. Pat. No. 8,831,129, which is a continuation of International Application No. PCT/CN2011/072364, filed on Mar. 31, 2011, which claims priority to Chinese Patent Application No. 201010283778.X, filed on Sep. 8, 2010. The afore-mentioned patent applications are hereby incorporated by reference in their entireties.

FIELD OF THE INVENTION

The present invention relates to the field of communications technologies, and in particular, to a method, an apparatus and a system for transmitting information bits.

BACKGROUND OF THE INVENTION

In a Long Term Evolution Advanced (LTE-A) system, an uplink physical channel includes: a Physical Uplink Shared Channel (PUSCH) and a Physical Uplink Control Channel (PUCCH). Generally, uplink control signaling is transmitted over the PUCCH, and mainly includes: Channel Quality Indicator (CQI) signaling, an Acknowledged/non-acknowledged (ACK/NACK) message and a Scheduling Request Indicator (SRI) message.

Specially, a transmission format (or a carrier) of the uplink ACK/NACK message on the PUCCH in the LTE-A system applies a transmission format based on Discrete Fourier Transform (DFT)-Spreading-Orthogonal Frequency Division Multiplex (OFDM), and an example of the format is shown in FIG. 1. The format occupies 12 sub-carriers in one Physical Resource Block (PRB) defined by the 3rd Generation Partnership Project (3GPP) LTE/LTE-A in one slot, each sub-carrier indirectly corresponds to a Quaternary Phase Shift Keying (QPSK) modulation symbol, and each QPSK modulation symbol carries two bits, and accordingly one slot needs to carry 12*2=24 bits in total, and thus the entire DFT-S-OFDM format needs to carry 24 QPSK modulation symbols, that is, 48 bits, in two slots.

The specific main process of transmitting the information bits by using the PUCCH format based on DFT-S-OFDM is as follows: as shown in FIG. 1, first, a transmitting end encodes the information bits to be transmitted through a certain channel encoding manner to generate a sequence of 48 coded bits $[b_0, b_1, \ldots, b_{47}]$, and then the 48 coded bits are scrambled, the 48 coded bits output after scrambling are modulated through the QPSK to obtain a sequence of 24 QPSK symbols $[q_0, q_1, \ldots, q_{23}]$, and then 12-point DFT is performed on the first 12 symbols of the 24 modulation symbols $[q_0, q_1, \ldots, q_{11}]$, the 12 data symbols $[Q_0, Q_1, \ldots, Q_{11}]$ output after the DFT are sequentially mapped onto the 12 sub-carriers of the first slot 0, in which the sequential mapping refers to that adjacent modulation symbols in the modulation symbol sequence are mapped onto adjacent sub-carriers, and afterwards, the data symbol on each sub-carrier is extended into five data symbols through a certain sequence $[w_0, w_1, \ldots, w_4]$ of length 5, and the data symbols are mapped into a location for the data symbols in the time domain; likewise, the last 12 QPSK modulation symbols $[Q_{12}, Q_{13}, \Lambda, Q_{23}]$ are mapped onto the second slot 1; and finally, a corresponding pilot is put on the preset pilot location and is transmitted. The process described above also has other equivalent implementation methods. For example, the obtained 24 modulation symbols are extended first, and then the DFT is performed on the modulation symbols mapped on each time domain symbol, and finally, the modulation symbols are mapped onto the physical channel for transmission.

It is assumed that, in the 48 coded bits generated by encoding the information bits to be transmitted, the first 24 coded bits b(0), b(1), . . . , b(23) and the last 24 coded bits b(24), b(25), . . . , b(47) are independently obtained. Accordingly, when a structure similar to DFT-S-OFDM is used, the modulation symbols corresponding to the first 24 coded bits are sequentially mapped onto the slot 0, and the last 24 coded bits are sequentially mapped onto the slot 1. In this way, the receiving of the first 24 coded bits merely depends on the channel condition of the slot 0. However, the channel condition of the slot 0 may be good or bad, and thus the receiving performance is not stable. Likewise, the receiving of the last 24 coded bits merely depends on the channel condition of the slot 1. Moreover, as shown in FIG. 1, the last symbol in the slot 1 may be occupied for other use sometimes, for example, the last symbol is used to transmit a Sounding Reference Signal (SRS) sometimes, and when such a case occurs, the extension length in the slot 1 of the DFT-S-OFDM format is shortened from the length 5 to a length 4. The performance of long extension length is better than the short one. As such, if the first 24 coded bits are merely mapped onto the slot 0, and the last 24 coded bits are merely mapped onto the slot 1, the receiving performance of the first 24 coded bits is better than the receiving performance of the last 24 coded bits on the whole, thereby causing unbalanced receiving performance, and requiring a rather complex algorithm of the receiver.

SUMMARY OF THE INVENTION

Accordingly, the embodiments of the present invention provide a method, an apparatus and a system for transmitting information bits.

To achieve the above objectives, an embodiment of the present invention adopts the following technical solution:

A method for transmitting information bits is provided, which includes: dividing information bits to be transmitted into at least two groups; encoding the information bits to be transmitted in each group; modulating coded bits obtained by encoding to obtain modulation symbols, in which each modulation symbol is obtained by modulating the coded bits in a same group; and mapping and transmitting the modulation symbols.

To achieve the above objectives, an embodiment of the present invention adopts the following technical solution:

An apparatus for transmitting information bits is provided, which includes: a grouping unit, configured to divide information bits to be transmitted into at least two groups; an encoding unit, configured to encode the information bits to be transmitted in each group; a modulating unit, configured to modulate coded bits obtained by encoding to obtain modulation symbols, in which each modulation symbol is obtained by modulating the coded bits in a same group, and a mapping and transmitting unit, configured to map and transmit the modulation symbols.

To achieve the above objectives, an embodiment of the present invention adopts the following technical solution: A system for transmitting information bits is provided, which includes a terminal and a base station in communication with the terminal, in which, the terminal is configured to divide information bits to be transmitted into at least two groups, encode the information bits to be transmitted in each group, modulate coded bits obtained by encoding to obtain modulation symbols, in which each modulation symbol is obtained by modulating the coded bits in a same group, and map the modulation symbols and transmit the modulation symbols to the base station; and the base station is configured to receive the modulation symbols transmitted by the terminal, and demodulate and decode the modulation symbols to obtain the information bits to be transmitted.

To achieve the above objectives, an embodiment of the present invention adopts the following technical solution: A method for transmitting information bits is provided, which includes: dividing information bits to be transmitted into at least two groups; encoding the information bits to be transmitted in each group to obtain at least two groups of coded bits; combining the at least two groups of coded bit obtained by the encoding to obtain a total coded bits sequence, in which, the total coded bits sequence is obtained by dividing the coded bits in each group into N sub-groups and reordering the sub-groups of the coded bit in each group, and the sub-groups in at least one group of the coded bits are discontinuously distributed in the total coded bit sequence after reordering; modulating the total coded bits sequence to obtain modulation symbols, in which each modulation symbol is obtained by using the modulation of the coded bits in the same group; and mapping and transmitting the modulation symbols.

To achieve the above objectives, an embodiment of the present invention adopts the following technical solution: An apparatus for transmitting information bits is provided, which includes: a grouping unit, configured to divide information bits to be transmitted into at least two groups; an encoding unit, configured to encode the information bits to be transmitted in each group divided by the grouping unit to obtain at least two groups of coded bit; a combining unit, configured to combine the at least two groups of coded bits obtained by the encoding of the encoding unit to obtain a total coded bits sequence, in which, the total coded bits sequence is obtained by dividing the encoded coded bit in each group into N sub-groups and reordering the sub-groups of the coded bits in each group, and the sub-groups in at least one group of the coded bits are discontinuously distributed in the total coded bit sequence after reordering; a modulating unit, configured to modulate the total coded bit sequence obtained by the combining unit to obtain modulation symbols, in which each modulation symbol is obtained by using the modulation of the coded bits in the same group; and a mapping and transmitting unit, configured to map and transmit the modulation symbols obtained by the modulating unit.

To achieve the above objectives, an embodiment of the present invention adopts the following technical solution: A method for transmitting information bits is provided, which includes: dividing information bits to be transmitted into at least two groups; encoding the information bits to be transmitted in each group; modulating the coded bits obtained by the encoding of each group to obtain modulation symbols of each group; combining the modulation symbols of each group to obtain a modulation symbol sequence; reordering the modulation symbol sequence, so that at least one group of the modulation symbols is discretely distributed in the modulation symbol sequence; and mapping and transmitting the modulation symbols.

To achieve the above objectives, an embodiment of the present invention adopts the following technical solution: An apparatus for transmitting information bits, which includes: a grouping unit, configured to divide information bits to be transmitted into at least two groups; an encoding unit, configured to encode the information bits to be transmitted in each group divided by the grouping unit; a modulating unit, configured to modulate the coded bits encoded by the encoding unit to obtain modulation symbols of each group; a combining unit, configured to combine the modulation symbols of each group modulated by the modulating unit to obtain a modulation symbol sequence; an ordering unit, configured to reorder the modulation symbol sequence obtained through the combining of the combining unit, so that at least one group of the modulation symbols is discretely distributed in the modulation symbol sequence; and a mapping and transmitting unit, configured to map and transmit the modulation symbols reordered by the ordering unit.

To achieve the above objectives, an embodiment of the present invention adopts the following technical solution: A method for transmitting information bits, which includes: dividing information bits to be transmitted into n groups, in which n is an integer greater than 1; encoding the information bits to be transmitted in each group to obtain coded bits sequences of the n groups; dividing the coded bits sequence of each group into N sub-groups, and reordering the sub-groups in each group of the coded bits, so that each group of the coded bits is discretely distributed in the total coded bits sequence; modulating the total coded bits sequence to obtain modulation symbols; and mapping and transmitting the modulation symbols.

To achieve the above objectives, an embodiment of the present invention adopts the following technical solution. An apparatus for transmitting information bits, which includes: a grouping unit, configured to divide the information bits to be transmitted into n groups, in which n is an integer greater than 1; an encoding unit, configured to encode the information bits to be transmitted in each group divided by the grouping unit to obtain coded bits sequences of the n groups; an ordering unit, configured to divide the coded bits sequence of each group obtained by the encoding unit into N sub-groups, and reorder the sub-groups in each group of the coded bits, so that each group of the coded bits is discretely distributed in the total coded bits sequence; a modulating unit, configured to modulate the total coded bits sequence reordered by the ordering unit to obtain modulation symbols; and a mapping and transmitting unit, configured to map and transmit the modulation symbols obtained by the modulating unit.

In the embodiments of the present invention, the terminal divides the information bits to be transmitted into at least two groups, and encodes the information bits to be transmitted in each group and modulates the encoded coded bits to obtain modulation symbols, in which each modulation symbol is obtained by using the modulation of the coded bits in the same group. Because the terminal first divides the information bits to be transmitted into at least two groups, and each modulation symbol after encoding and modulation is obtained by using the coded bits in the same group, a receiving end may easily reduce the algorithm complexity, thereby ensuring the performance of the receiving end.

DETAILED DESCRIPTION OF THE EMBODIMENT

The technical solutions of the present invention are clearly described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 2:
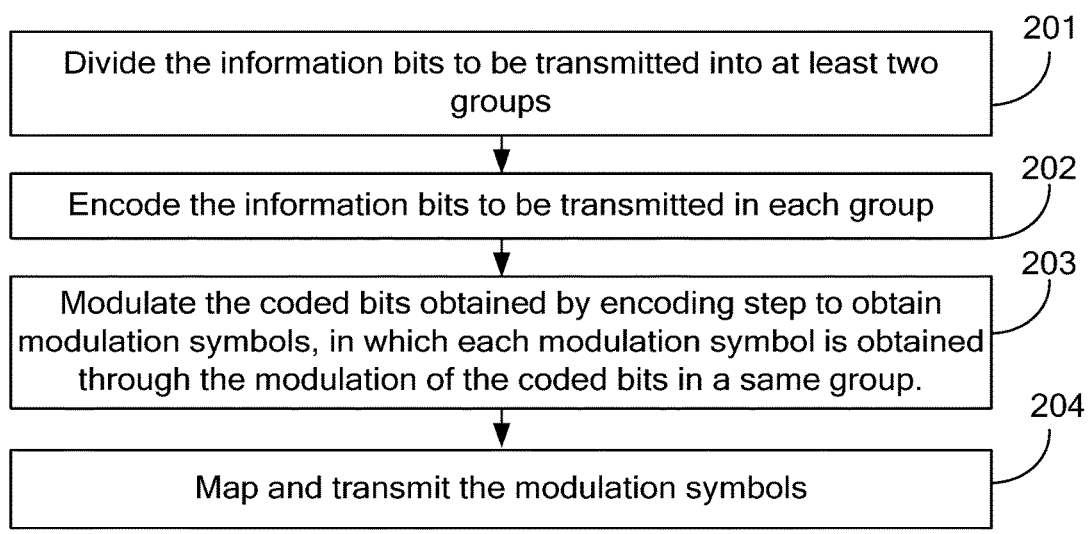
FIG. 2 is a flowchart of a method for transmitting information bits according to an embodiment of the present invention.

An embodiment of the present invention provides a method for transmitting information bits, and as shown in FIG. 2, the method includes the following steps:

Step 201: Divide the information bits to be transmitted into at least two groups.

In step 201, a terminal divides the information bits to be transmitted into at least two groups, that is, two or more groups. Each group may have a same or different number of information bits. In addition, the information bits to be transmitted include at least one of the following uplink control information bits: a CQI, a Precoding Matrix Index (PMI), a Rank Indicator (RI), ACK/NACK information and an SRI.

Step 202: Encode the information bits to be transmitted in each group.

Step 203: Modulate the coded bits obtained by encoding step to obtain modulation symbols, in which each modulation symbol is obtained by using the modulation of the coded bits in a same group.

The modulating the coded bits obtained by the encoding step to obtain the modulation symbols specifically includes the following two manners.

The first manner is as follows: dividing the coded bits obtained by the encoding step in each group into N sub-groups to obtain a coded bit sub-group sequence of each group; combining the coded bits sub-group sequence of each group to obtain a total coded bits sub-group sequence; reordering the total coded bits sub-group sequence, so that the coded bits sub-group sequence of at least one group is discontinuously distributed in the total coded bits sub-group sequence; and modulating the reordered total coded bits sub-group sequence to obtain the modulation symbols. In addition, the reordering the total coded bits sub-group sequence, in order that the coded bits sub-group sequence of at least one group is discontinuously distributed in the total coded bits sub-group sequence, which includes: alternately ordering the coded bits sub-group sequence of each group in the total coded bit sub-group sequence.

The second manner is as follows: the modulating of all the coded bits after respective encoding to obtain a modulation symbol sequence specifically includes: modulating the coded bits of each group obtained by the encoding step to obtain the modulation symbols of each group; combining the modulation symbols of each group to obtain a modulation symbol sequence; and reordering the modulation symbol sequence, so that at least one group of the modulation symbols is discontinuously distributed in the modulation symbol sequence. In addition, the reordering of the modulation symbol sequence to enable at least one group of the modulation symbols to be discontinuously distributed in the modulation symbol sequence specifically includes: alternately ordering the modulation symbols of each group in the modulation symbol sequence.

Step 204: Map and transmit the modulation symbols.

The terminal divides the information bits to be transmitted into at least two groups, and encodes the information bits to be transmitted in each group and modulates the coded bits obtained by encoding step to obtain modulation symbols, in which each modulation symbol is obtained by using the modulation of the coded bits in the same group. Because the terminal first divides the information bits to be transmitted into at least two groups, and each modulation symbol after encoding and modulation is obtained by using the coded bits in the same group, a receiving end may easily reduce the algorithm complexity, thereby ensuring the performance of the receiving end.

Figure 3:
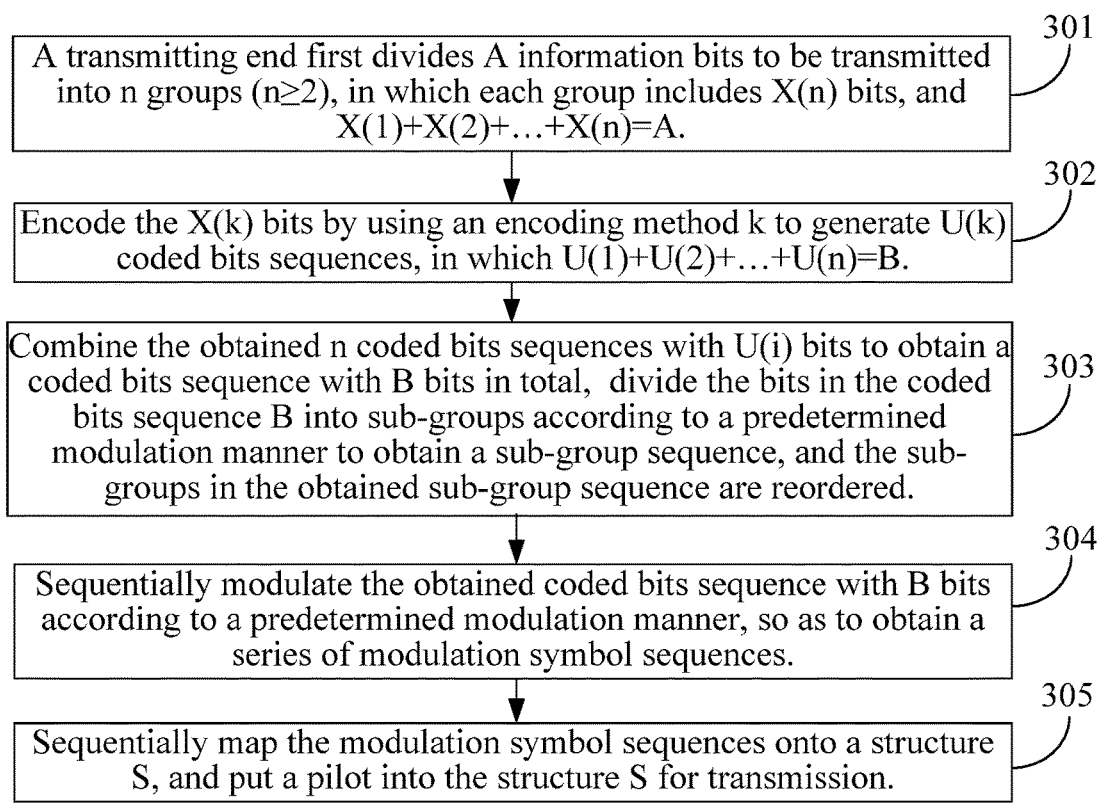
FIG. 3 is a flowchart of another method for transmitting information bits according to an embodiment of the present invention.

An embodiment of the present invention provides a method for transmitting information bits, and as shown in FIG. 3, the method includes the following steps:

Step 301: A transmitting end first divides A information bits to be transmitted into n groups (n≥2), in which each group includes X(n) bits, and X(1)+X(2)+ . . . +X(n)=A.

Each group may have a same or different number of bits in this step. For example, 20 information bits are to be transmitted, which may be divided into two parts each having 10 bits, that is, X(1)=X(2)=10. Specifically, the transmitting end may be LTE/LTE-A user equipment (UE), and the information bits to be transmitted are uplink control information bits which include but are not limited to a CQI and/or a PMI and/or ACK/NACK information and/or an SRI.

In this step, dividing A information bits may also include the following sub-steps. When the A information bits include control information bits of different types, the A information bits may be grouped by the types of the control information, that is, the bits of different types may be put in different groups. Because the receiving performance required by the control information bits of different types is not totally the same, the control information bits of different types may be separately encoded. For example, the CQI information bits in the A information bits are put in one group, and the ACK/NACK information is put in another group; or the SRI information bits in the A information bits are put in one group, and the ACK/NACK information is put in another group; or the CQI information bits in the A information bits are put in one group, and the SRI information is put in another group. Specifically, for example, if 16 information bits include 10 CQI bits and 6 ACK/NACK bits, the 10 CQI bits are defined as one group, and the 6 ACK/NACK bits are defined as another group.

In this step, the dividing A information bits may also include the following sub-steps. When the A information bits include a plurality of carrier CQIs, the A information bits may be grouped by carriers, that is, the CQIs of different carriers may be put in different groups. For example, if 17 information bits include 11 CQI bits of the carrier 1 and 6 CQI bits of the carrier 2, the 11 CQI bits of the carrier 1 are put in one group, and the 6 CQI bits of the carrier 2 are put in another group.

In this step, the dividing A information bits may also include the following sub-steps. When the A information bits include the CQI, the ACK/NACK and the SRI, the information bits corresponding to the ACK/NACK and the SRI are put in one group, the information bits corresponding to the CQI are put in another group; or the information bits corresponding to the CQI and the SRI are put in one group, and the information bits corresponding to the ACK/NACK are put in another group. For example, if 18 information bits include 11 CQI bits, 6 ACK/NACK information bits and 1 SRI information bit, the 11 CQI bits are put in one group, and the 6 ACK/NACK information bits and the 1 SRI information bit are put in another group.

Step 302: Encode the X(k) bits by using an encoding method k to generate U(k) coded bit sequences, in which U(1)+U(2)+ ... +U(n)=B, B is the total number of coded bits, and U(k) is an integral multiple of the number of bits that is represented by one modulation symbol in a predetermined modulation manner.

Figure 1:
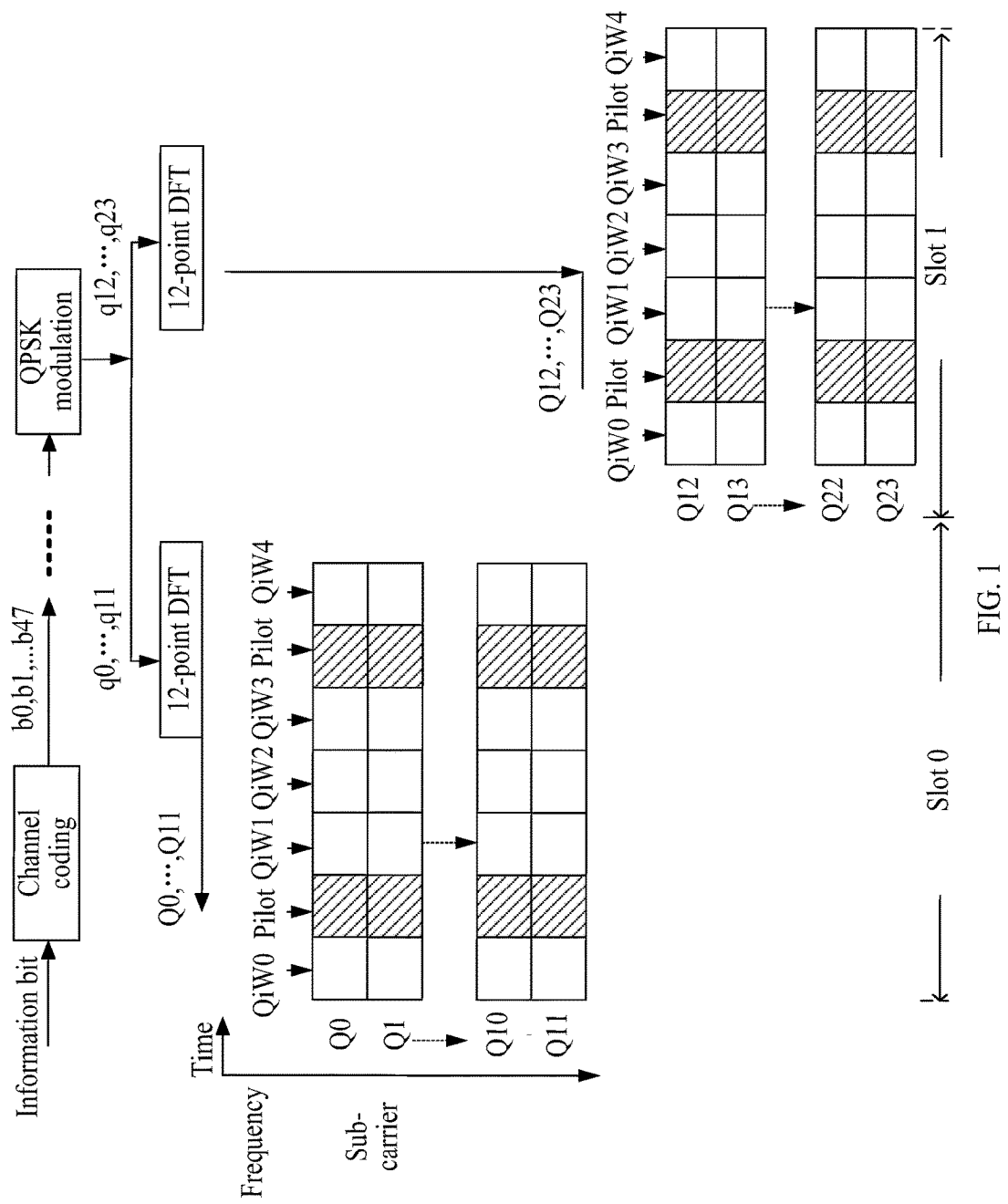
FIG. 1 is a schematic architectural view of transmission of information bits by using a PUCCH format based on DFT-S-OFDM in the prior art.

Whether the encoding methods i, j are the same is not limited, for example, if the modulation manner is predetermined to be QPSK modulation, the number of bits included in each U(k) is a multiple of 2; if the modulation manner is predetermined to be 16-Quadrature Amplitude Modulation (16QAM), the number of bits included in each U(k) is a multiple of 4; and so forth. Specifically, when the DFT-S-OFDM illustrated in FIG. 1 is used, X(1) and X(2) each need to be encoded to generate 24 coded bits sequences, that is, U(1)=U(2)=24 and B=48, and the specific encoding methods may be to generate a coded bits sequence with 32 bits based on Table 1 and Formula (2) in the following, and then select and delete 8 bits from the 32 bits, so as to obtain the coded bits sequence with 24 bits. The simplest manner is to directly delete the last 8 bits in the 32 bits to obtain the bit sequence with 24 bits. The coded bits sequence with 32 bits may be obtained by using the following formula (2):

$$U_{kj} = \left[ \sum_{n=0}^{X_k-1} (x_{kn} \cdot M_{j,n}) \right] \bmod 2,$$

in which, $M_{i,n}$ is a corresponding element in an encoding matrix, and i=0, 1, ..., 31; $x_{kn}$ is the $n^{th}$ information bit in the X(k) bits to be transmitted, and n=0, $\Lambda$ $X_k$-1; and $U_{kj}$ is the $j^{th}$ bit in the coded bits sequence U(k).

TABLE 1

| i | Mi,0 | Mi,1 | Mi,2 | Mi,3 | Mi,4 | Mi,5 | Mi,6 | Mi,7 | Mi,8 | Mi,9 | Mi,10 |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 1 | 0 | 1 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 0 | 1 | 0 | 1 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 0 | 1 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |

TABLE 1-continued

| i | Mi,0 | Mi,1 | Mi,2 | Mi,3 | Mi,4 | Mi,5 | Mi,6 | Mi,7 | Mi,8 | Mi,9 | Mi,10 |
|---|---|---|---|---|---|---|---|---|---|---|---|
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The specific encoding methods may also both be to generate a coded bits sequence with 20 bits based on Table 2 and Formula (3) in the following, and then select 4 bits from the 20 bits and add the 4 bits behind the end of the bit sequence with 20 bits, so as to obtain the coded bits sequence with 24 bits, in which, the relative order of the added 4 bits may be different from the relative order of the 4 bits in the previous coded bits sequence with 20 bits. The simplest manner is to directly select the first 4 bits from the 20 bits and then put the 4 bits after the 20 bits. The coded bits sequence with 20 bits may be obtained by using the following formula (3):

$$U_{kj} = \left[\sum_{n=0}^{X_k-1} (x_{kn} \cdot M_{j,n})\right] \bmod 2,$$

in which, $M_{i,n}$ is a corresponding element in the encoding matrix, and $i=0, 1, \ldots, 19$; $x_{kn}$ is the $n^{th}$ information bit in the $X(k)$ bits to be transmitted, and $n=0, \Lambda\ X_k-1$; and $U_{kj}$ is the $j^{th}$ bit in the coded bits sequence $U(k)$.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 1 | 0 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 1 | 0 | 0 | 0 | 1 | 1 | 1 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 1 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 0 | 0 | 0 | 0 | 0 | 0 |
| 19 | 1 | 0 | 0 | 0 | 0 | 1 | 1 | 0 | 0 | 0 | 0 | 0 | 0 |

As for specific encoding methods, one group of the information bits may be based on the method described in Table 1, and another group may be based on the method described in Table 2. The specific encoding methods may also both adopt a convolutional code, and the specific implementation of the convolutional code may adopt the implementation manner adopted in 3GPP Universal Terrestrial Radio Access (UTRA) Release 6 or 3GPP LTE Release 8, or other implementation manners, but is not limited thereto.

The encoded coded bits of each group may also be respectively and separately reordered. For example, the bits in U(1) are reordered according to the sequence determined by the following formula (4): (Pn+1) mod 24, n=0, 1, L 23, in which, mod is modulo operation, P is a number which is relatively prime to 24, such as 11 and 13, and when P=13, the sequence determined by the formula is as follows: [1, 14, 3, 16, 5, 18, 7, 20, 9, 22, 11, 0, 13, 2, 15, 4, 17, 6, 19, 8, 21, 10, 23, 12]; and the codeword sequence of U(1) after reordering is as follows: $[U_{1,1}, U_{1,14}, U_{1,3}, \ldots, U_{1,23}, U_{1,12}]$.

Step 303: Combine the obtained n coded bits sequences with U(i) bits to obtain a coded bit sequence with B bits in total, in which, the relative order between groups during combining is not limited, and may be any order, and then the bits in the codeword sequence B are divided into sub-groups according to a predetermined modulation manner to obtain a sub-group sequence, the sub-groups in the obtained sub-group sequence are reordered, so that the sub-groups formed by the coded bits from each U(i) are discretely distributed in the entire sub-group sequence, and finally, the sub-groups are ungrouped to obtain another coded bit sequence with B bits.

For example, if the modulation manner is predetermined to be the QPSK modulation, every two coded bits make up one sub-group; if the modulation manner is predetermined to be the 16QAM, every four coded bits make up one sub-group; and so forth.

Specifically, when the DFT-S-OFDM is used, the modulation manner is predetermined to be the QPSK modulation, and U(1)=U(2)=24, U(1) and U(2) are first combined into U(1)U(2) or U(2)U(1), and a coded bits sequence B with 48 bits is obtained. By taking B=U(1)U(2)=$[U_{1,0}, U_{1,1}, \Lambda, U_{1,23}, U_{2,0}, U_{2,1}, \Lambda, U_{2,23}]$ as an example, B is first divided into sub-groups to obtain $[(U_{1,0}, U_{1,1}), \Lambda, (U_{1,22}, U_{1,23}), (U_{2,0}, U_{2,1}), \Lambda, (U_{2,22}, U_{2,23})]$, the sub-groups are reordered into $[(U_{1,0}, U_{1,1}), (U_{2,0}, U_{2,1}), (U_{1,2}, U_{1,3}), (U_{2,2}, U_{2,3}), L, (U_{1,22}, U_{1,23}), (U_{2,22}, U_{2,23})]$, and finally, the sub-groups are ungrouped to obtain another coded bit sequence $[U_{1,0}, U_{1,1}, U_{2,0}, U_{2,2}, \Lambda, U_{1,22}, U_{1,23}, U_{2,22}, U_{2,23}]$.

The reordering the sub-groups to enable each group of the codeword bits to be discretely distributed in the whole coded bits sequence in the foregoing description aims to obtain better performance. By still taking B=U(1)U(2)=[$U_{1,0}$, $U_{1,1}$, Λ, $U_{1,23}$, $U_{2,0}$, $U_{2,1}$, Λ, $U_{2,23}$] as an example, before reordering, if a structure similar to DFT-S-OFDM is directly used for the coded bits sequence B to transmit the information bits, the coded bit sequence U(1) generated through the encoding of X(1) bits is finally mapped onto the slot 0 only, and likewise, U(2) is finally mapped onto the slot 1 only. In this way, the receiving of the X(1) bits merely depends on the channel condition of the slot 0, and because the channel condition of the slot 0 may be good or bad, the receiving performance is not stable, and likewise the X(2) bits have similar problems. In another aspect, the last symbol in the slot 1 illustrated in FIG. 1 may be occupied for other use sometimes, for example, the last symbol may be used to transmit an SRS sometimes, and when such a case occurs, the extension length in the slot 1 of the DFT-S-OFDM format is shortened from the length 5 to a length 4. The performance of long extension length is better than the short one. As such, if the U(1) is mapped onto the slot 0, and the U(2) is mapped onto the slot 1, the receiving performance of the X(1) bits is better than the performance of the X(2) bits on the whole, thereby causing unbalanced receiving performance. After reordering, by taking the coded bits sequence [$U_{1,0}$, $U_{1,1}$, $U_{2,0}$ $U_{2,2}$, Λ, $U_{1,22}$, $U_{1,23}$, $U_{2,22}$, $U_{2,23}$] obtained through ordering as an example, the coded bits in the U(1) are distributed in both the slot 0 and the slot 1, and in this way, the receiving of the X(1) bits depends on the channel conditions of the two slots at the same time. Because the probability that the channel conditions of the two slots are bad at the same time is small, the receiving performance of the X(1) bits is not too bad in most cases. Likewise, the receiving performance of the X(2) bits is also not too bad. On the other hand, when the last symbol in the slot 1 is occupied for other use, the extension length of some of X(1) and X(2) may be a length 5 or a length 4, which is fair to X(1) and X(2), thereby achieving balanced performance. Because the sub-groups are reordered, so that the coded bits of the sub-groups are distributed as discretely as possible and finally, the coded bits are distributed on each of the slots, which is important for improving the receiving performance.

Step 304: Sequentially modulate the obtained coded bits sequence with B bits according to a predetermined modulation manner, so as to obtain a series of modulation symbol sequences.

Specifically, the modulation manner may be QPSK modulation or 16QAM. When the QPSK modulation is used, the sequential modulation is that, b(0) and b(1) are modulated into the modulation symbol q(0), b(2) and b(3) are modulated into the modulation symbol q(1), and so forth. When the 16QAM is used, the sequential modulation is that, b(0), b(1), b(2) and b(3) are modulated into the modulation symbol q(0), b(4), b(5), b(6) and b(7) are modulated into the modulation symbol q(1), and so forth.

It should be noted that, the grouping of the sub-groups in step 303 aims to ensure that the coded bits included in each modulation symbol obtained after the modulation in step 304 are from the same encoding group U(i), and thus the receiving end may easily implement the symbol-level maximum likelihood algorithm with good performance and controls the complexity, thereby ensuring the algorithm implementation of the receiving end and the performance. Specifically, if the reordering on the coded bits sequence is performed by using an ordinary reordering manner without any restriction or specific requirements, that is, every coded bit is independent, the coded bit may be placed at any location and has no relation with the location of adjacent coded bits, for example, the coded bits sequence obtained by using such an ordering manner may be B=[$U_{1,0}$, $U_{2,0}$, $U_{1,1}$, $U_{2,1}$, Λ, $U_{1,23}$, $U_{2,23}$], that is, the coded bits sequences in U(1) and U(2) are alternately placed together. In this case, the receiving end cannot use the symbol-level maximum likelihood algorithm with good performance for the sub-code groups independently, because the bits included in some modulation symbols belong to different sub-code groups, for example, the coded bits $U_{1,0}$, $U_{2,0}$ in B may be modulated into a QPSK modulation symbol, but they come from different sub-code groups. If the symbol-level maximum likelihood algorithm must be used, the sub-code groups have to be jointly processed, and the complexity thereof is very high. The reason lies in that the maximum likelihood algorithm generally needs to search for all the probabilities, and herein, the maximum likelihood algorithm needs to search through all modulation symbol sequences, and moreover, the maximum likelihood algorithm needs to jointly search through all possible coded bits sequences in all code groups. By taking two sub-code groups each having 10 bits as an example, the joint search needs to search $2^{10}*2^{10}$ (more than one million) different probabilities. If virtual grouping is first performed to ensure that the coded bits in each modulation symbol are from the same sub-code group, the receiving end may select all the modulation symbols belonging to different sub-code groups and use the symbol-level maximum likelihood algorithm for the modulation symbols independently, thereby dramatically reducing the complexity. For example, by still taking two code groups each having 10 bits as an example, the maximum likelihood algorithm for the sub-code groups independently needs to search $2^{10}+2^{10}$ (about 2000) different probabilities, and the complexity thereof is dramatically reduced in comparison with the one million probabilities.

Step 305: Sequentially map the modulation symbol sequences onto a structure S, and put a pilot into the structure S for transmission.

The structure S herein refers to a structure similar to DFT-S-OFDM, that is, the physical resources occupied by the structure occupy at least two time periods with almost independent channel condition in time domain, and/or occupy at least two frequency bands with almost independent channel condition in frequency domain. Specifically, when the DFT-S-OFDM is used, the mapping further includes: performing operations such as DFT and extension first, and then sequential mapping, that is, adjacent symbols are mapped onto adjacent sub-carriers.

Correspondingly, the receiving end needs to receive the symbols according to an encoding method, a modulation manner for each sub-group and a reordering rule used by the transmitting end, including: restoring an original order according to the reordering rule and performing demodulation and decoding, which will not be described in detail herein. The receiving end may be a base station.

For the purpose of easily observing the performance of the method for transmitting information bits in this embodiment, the information bits are divided into two groups in the following, which are both encoded through Table 1, and then are alternately ordered, and moreover, the transmission through the DFT-S-OFDM format illustrated in FIG. 1 is used as a representative to give the performance of this embodiment. The performance comparison is implemented through simulation, and the simulation condition is as follows: 5 megahertz (MHz) bandwidth, Evolved Typical Urban (ETU) channel, moving speed of 3 km/h of UE, architecture of 1 transmitting and two receiving antennas, and using real channel estimation.

Figure 4:
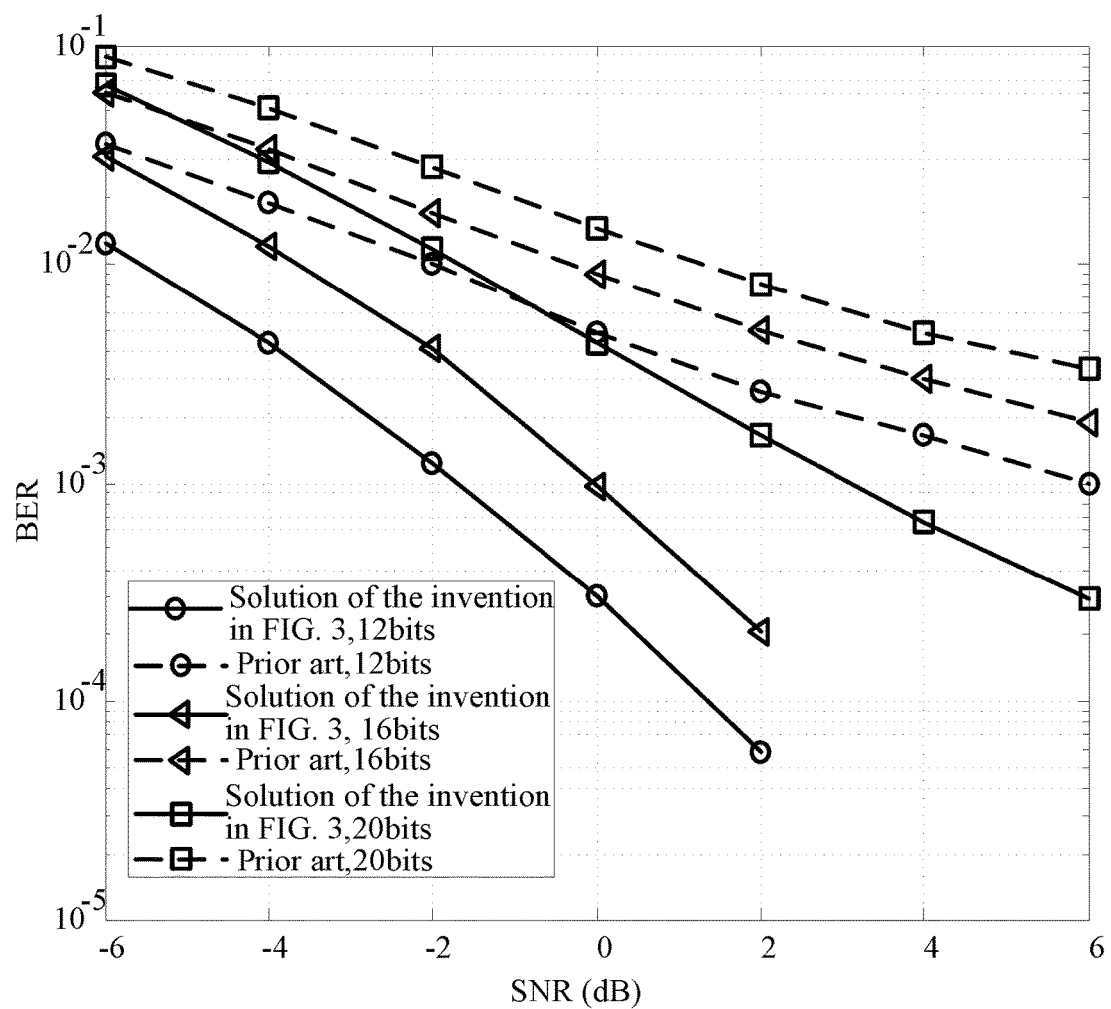
FIG. 4 is a schematic diagram of a simulation result in the case that the number of information bits to be transmitted is 12 bits, 16 bits, and 20 bits according to an embodiment of the present invention.

Referring to FIG. 4, FIG. 4 is a schematic diagram of the simulation result in the case that the number of information bits to be transmitted is 12 bits, 16 bits, and 20 bits. In FIG. 4, horizontal coordinates represent a Signal-to-Noise Ratio (SNR) in the unit of dB, and vertical coordinates represents a Bit Error Rate (BER). At this time, the smaller the SNR required to achieve the same BER is, the better the performance is.

Figure 5:
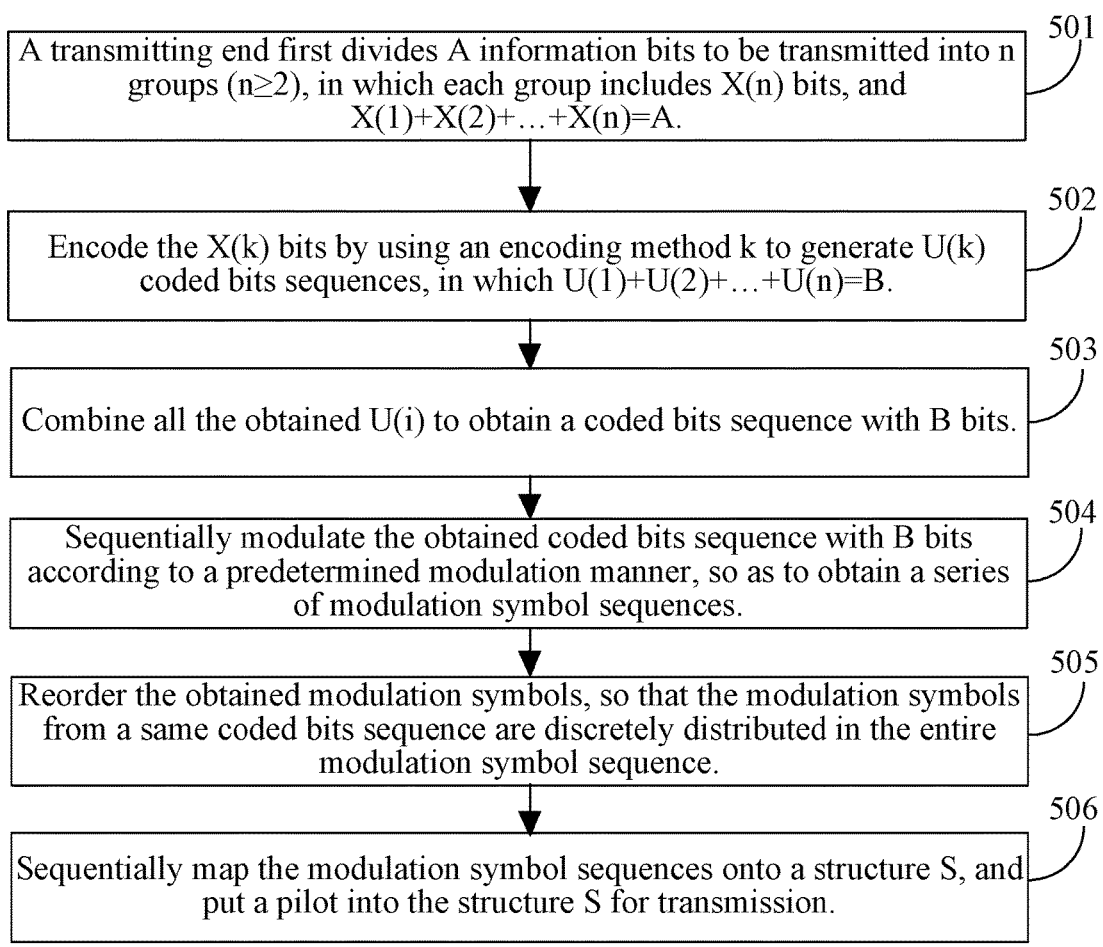
FIG. 5 is a flowchart of still another method for transmitting information bits according to an embodiment of the present invention.

An embodiment of the present invention provides a method for transmitting information bits, and as shown in FIG. 5, the method includes the following steps:

Step 501: A transmitting end first divides A information bits to be transmitted into n groups (n≥2), in which each group includes X(n) bits, and X(1)+X(2)± . . . +X(n)=A. Each group may have a same or different number of bits in this step. For example, 20 information bits are to be transmitted, which may be divided into two parts each having 10 bits, that is, X(1)=X(2)=10. Specifically, the transmitting end may be LTE/LTE-A UE, and the information bits to be transmitted are uplink control information bits which include but are not limited to a CQI and/or a PMI and/or an RI and/or ACK/NACK information and/or an SRI.

In this step, the dividing A information bits may also include the following sub-steps. When the A information bits include control information bits of different types, the A information bits may be grouped by the types of the control information, that is, the bits of different types may be put in different groups. Because the receiving performance required by the control information bits of different types is not totally the same, the control information bits of different types may be separately encoded. For example, the CQI information bits in the A information bits are put in one group, and the ACK/NACK information is put in another group; or the SRI information bits in the A information bits are put in one group, and the ACK/NACK information is put in another group; or the CQI information bits in the A information bits are put in one group, and the SRI information is put in another group. Specifically, for example, if 16 information bits include 10 CQI bits and 6 ACK/NACK bits, the 10 CQI bits are separately defined as a group, and the 6 ACK/NACK bits are separately defined as a group.

In this step, the dividing A information bits may also include the following sub-steps. When the A information bits include a plurality of carrier CQIs, the A information bits may be grouped by carriers, that is, the CQIs of different carriers may be put in different groups. For example, if 17 information bits include 11 CQI bits of the carrier 1 and 6 CQI bits of the carrier 2, the 11 CQI bits of the carrier 1 are put in one group, and the 6 CQI bits of the carrier 2 are put in another group.

In this step, the dividing A information bits may also include the following sub-steps. When the A information bits include the CQI, the ACK/NACK and the SRI, the information bits corresponding to the ACK/NACK and the SRI are put in one group, the information bits corresponding to the CQI are put in another group; or the information bits corresponding to the CQI and the SRI are put in one group, and the information bits corresponding to the ACK/NACK are put in another group. For example, if 18 information bits include 11 CQI bits, 6 ACK/NACK information bits and 1 SRI information bit, the 11 CQI bits are put in one group, and the 6 ACK/NACK information bits and the 1 SRI information bit are put in another group.

Step 502: Encode the X(k) bits by using an encoding method k to generate U(k) coded bits sequences, in which U(1)+U(2)± . . . +U(n)=B, B is the total number of coded bits, and U(k) is an integral multiple of the number of bits that is represented by one modulation symbol in a predetermined modulation manner. Whether the encoding methods i, j are the same is not limited.

For example, if the modulation manner is set to be QPSK modulation, the number of bits included in each U(k) is a multiple of 2; if the modulation manner is set to be 16QAM, the number of bits included in each U(k) is a multiple of 4; and so forth. The specific encoding method is similar to Step 302 in FIG. 3, so that the details will not be described herein again.

Step 503: Combine all the obtained U(i) to obtain a coded bits sequence with B bits.

In the combining method of this step, the relative order between groups during combining is not limited, and may be any order. For example, the U(i) may be combined in an ascending or descending order of the value of i. For example, if two coded bits sequences are generated in Step 503, the U(i) may be combined according to the order of first U1 and then U2, or according to the order of first U2 and then U1.

Step 504: Sequentially modulate the obtained coded bits sequence with B bits according to a predetermined modulation manner, so as to obtain a series of modulation symbol sequences.

Specifically, the modulation manner may be QPSK modulation or 16QAM. When the QPSK modulation is used, the sequential modulation is that, b(0) and b(1) are modulated into the modulation symbol q(0), b(2) and b(3) are modulated into the modulation symbol q(1), and so forth. When the 16QAM is used, the sequential modulation is that, b(0), b(1), b(2) and b(3) are modulated into the modulation symbol q(0), b(4), b(5), b(6) and b(7) are modulated into the modulation symbol q(1), and so forth.

Step 505: Reorder the obtained modulation symbols, so that the modulation symbols from a same coded bits sequence are discretely distributed in the entire modulation symbol sequence.

Specifically, when U(1)=U(2)=24, after using the QPSK modulation, the U(1) generates $[q_{1,0}, q_{1,1}, \Lambda, q_{1,11}]$ and U(2) generates $[q_{2,0}, q_{2,1}, \Delta, q_{2,11}]$, and the modulation symbols are ordered to obtain a modulation symbol sequence Q with the length 24. For example, the modulation symbol sequence Q obtained after reordering may be shown in the following, in which not all the orders can be described through a formula or a rule, and can only be reflected through the final result. The orders are as follows: the first order: $Q=[q_{1,0}, q_{2,0}, q_{1,1}, q_{2,1}, \Lambda, q_{1,11}, q_{2,11}]$; the second order: $Q=[q_{1,0}, q_{1,1}, \Lambda, q_{1,5}, q_{2,0}, q_{2,1}, \Lambda, q_{2,5}, q_{1,6}, q_{1,7}, \Lambda, q_{1,11}, q_{2,6}, q_{2,7}, \Lambda, q_{2,11}]$; and the third order: $Q=[q_{1,0}, q_{1,1}, q_{2,0}, q_{2,1}, q_{1,2}, q_{1,3}, q_{2,2}, q_{2,3}, \Lambda, q_{1,10}, q_{1,11}, q_{2,10}, \Lambda, q_{2,11}]$.

The modulation symbol sequence with the length 24 $[q_{1,0}, q_{1,1}, \Lambda, q_{1,11}, q_{2,0}, q_{2,1}, \Lambda, q_{2,11}]$ may also be reordered according to the sequence determined by the following formula (5): (Pn+1)mod 24, n=0, 1, Λ, 23, in which, mod is modulo operation, P is a number which is relatively prime to 24, such as 11 and 13; and when P=13, the sequence determined by the formula is as follows: [1, 14, 3, 16, 5, 18, 7, 20, 9, 22, 11, 0, 13, 2, 15, 4, 17, 6, 19, 8, 21, 10, 23, 12]; and the modulation symbol sequence after reordering is as follows: $[q_{1,1}, q_{2,2}, q_{1,3}, q_{2,4}, q_{1,5}, q_{2,6}, q_{1,7}, L, q_{1,10}, q_{2,1}, q_{2,0}]$.

The objective of reordering is the same as the description of Step 303 in FIG. 3, so that the details will not be described herein again. It should be noted that, the foregoing description is merely some examples of the ordering manners, and the present invention does not limit the specific ordering manners.

Step 506: Sequentially map the modulation symbol sequences onto a structure S, and put a pilot into the structure S for transmission.

Specifically, when the DFT-S-OFDM is used, the mapping further includes operations such as spreading and DFT, followed by sequential mapping.

Correspondingly, the receiving end needs to receive the symbols according to an encoding method, a modulation manner and a reordering rule used for each sub-group by the transmitting end, including: restoring an original order according to the reordering rule and performing demodulation and decoding, which will not be described in detail herein. The receiving end may be a base station.

Figure 6:
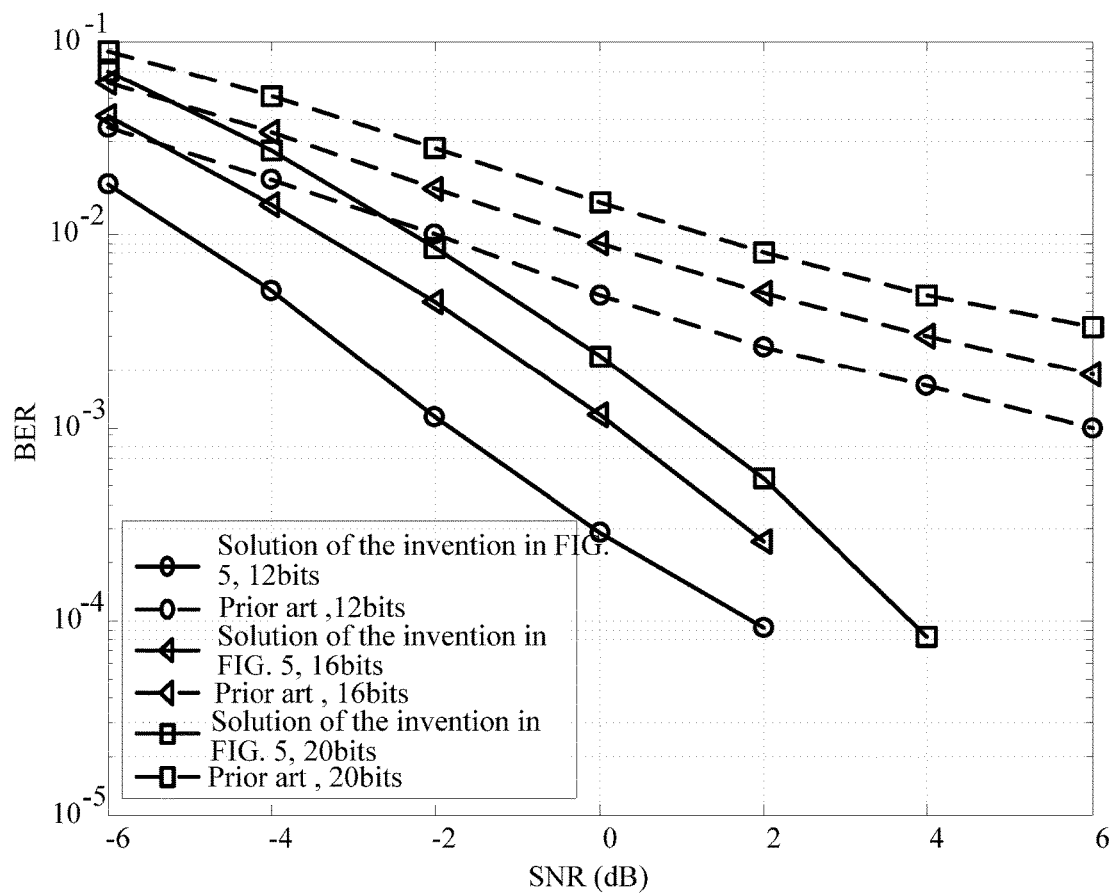
FIG. 6 is a schematic diagram of a simulation result in the case that the number of information bits to be transmitted is 12 bits, 16 bits, and 20 bits according to an embodiment of the present invention.

For the purpose of easily observing the performance of the method for transmitting information bits in this embodiment, the information bits are divided into two groups in the following, which are both encoded through Table 1, and then the modulation symbols are alternately ordered, and moreover, the transmission through the DFT-S-OFDM format illustrated in FIG. 1 is used as a representative to give the performance of this embodiment. The performance comparison is implemented through simulation, and the simulation condition is as follows: 5 MHz bandwidth, ETU channel, moving speed of 3 km/h of UE, architecture of 1 transmitting and two receiving antennas, and using real channel estimation. Referring to FIG. 6, FIG. 6 is a schematic diagram of the simulation result in the case that the number of information bits to be transmitted is 12 bits, 16 bits, and 20 bits. In FIG. 6, horizontal coordinates represent an SNR in the unit of dB, and vertical coordinates represent a BER. At this time, the smaller the SNR required to achieve the same BER is, the better the performance is.

Figure 7:
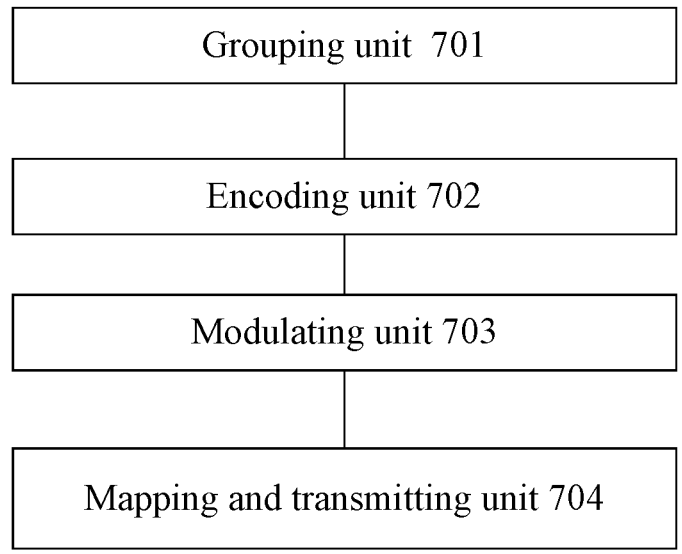
FIG. 7 is a schematic diagram of an apparatus for transmitting information bits according to an embodiment of the present invention.

An embodiment of the present invention provides an apparatus for transmitting information bits, and as shown in FIG. 7, the apparatus includes: a grouping unit 701, configured to divide information bits to be transmitted into at least two groups; an encoding unit 702, configured to encode the information bits to be transmitted in each group; a modulating unit 703, configured to modulate the encoded coded bits to obtain modulation symbols, in which each modulation symbol is obtained by using the modulation of the coded bits in the same group; and a mapping and transmitting unit 704, configured to map and transmit the modulation symbols.

In the grouping unit 701, each group may have a same or different number of information bits. In addition, the information bits to be transmitted include at least one of the following uplink control information bits: a CQI, a PMI, an RI, ACK/NACK information and an SRI.

Figure 8:
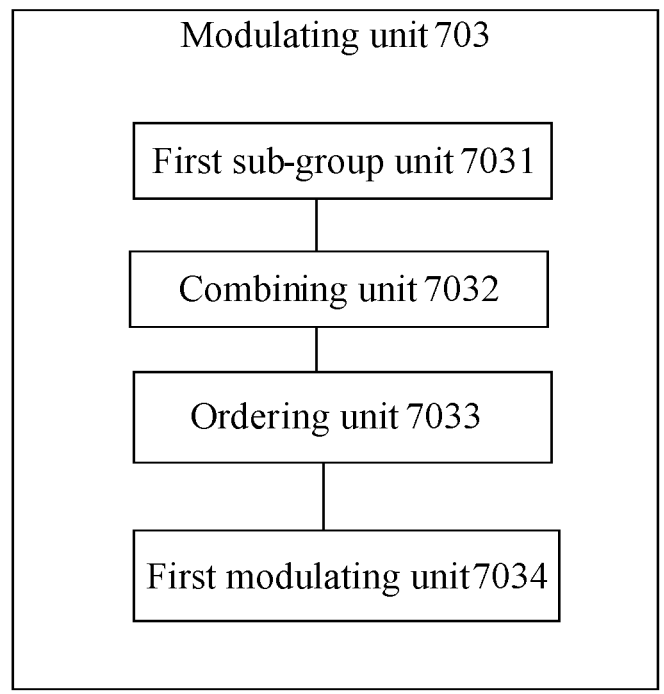
FIG. 8 is a schematic structural view of a modulating unit according to an embodiment of the present invention.

The specific structure of the modulating unit 703 is shown in FIG. 8, which includes: a first sub-group unit 7031, configured to divide the encoded coded bits in each group into N sub-groups to obtain a coded bits sub-group sequence of each group; a combining unit 7032, configured to combine the coded bits sub-group sequence of each group to obtain a total coded bits sub-group sequence; an ordering unit 7033, configured to reorder the total coded bits sub-group sequence, so that the coded bits sub-group sequence of at least one group is discontinuously distributed in the total coded bits sub-group sequence; and a first modulating unit 7034, configured to modulate the reordered total coded bits sub-group sequence to obtain modulation symbols. As for the specific implementation of the first sub-group unit 7031, the combining unit 7032, the ordering unit 7033 and the first modulating unit 7034, reference may be made to step 302, so that the details will not be described herein again.

The ordering unit 7033 further includes: a first ordering unit (not shown), configured to alternately order the coded bits sub-group sequence of each group in the total coded bits sub-group sequence, and as for the specific implementation, reference may be made to step 302, so that the details are not described herein again.

Figure 9:
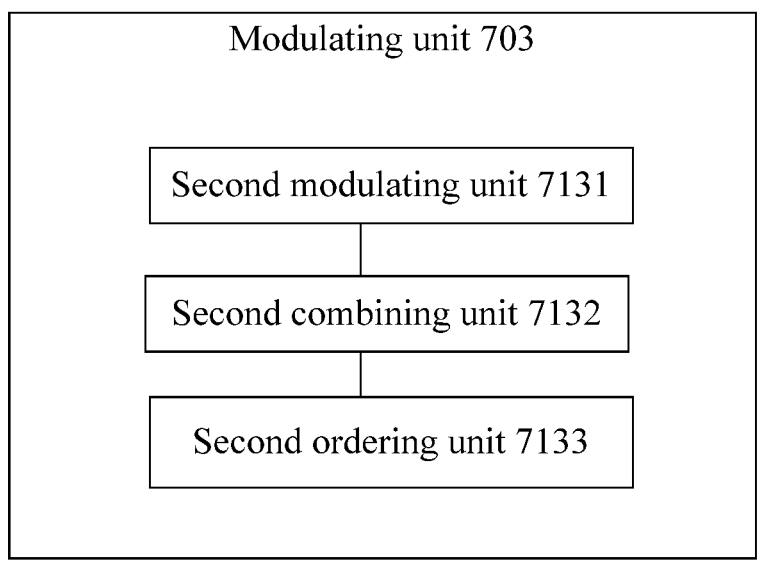
FIG. 9 is another schematic structural view of a modulating unit according to an embodiment of the present invention.

Referring to FIG. 9, the modulation unit 703 may include: a second modulating unit 7131, configured to modulate the encoded coded bits of each group to obtain the modulation symbols of each group; a second combining unit 7132, configured to combine the modulation symbols of each group to obtain a modulation symbol sequence; and a second ordering unit 7133, configured to reorder the modulation symbol sequence, so that at least one group of the modulation symbols is discontinuously distributed in the modulation symbol sequence. As for the specific implementation of the second modulating unit 7131, the second combining unit 7132 and the second ordering unit 7133, reference may be made to steps 503, 504 and 505, so that the details will not be described herein again.

The second ordering unit 7133 includes: a third ordering unit (not shown), configured to alternately order the modulation symbols of each group in the modulation symbol sequence, and as for the specific implementation manner, reference may be made to step 505, so that the details will not be described herein again.

An embodiment of the present invention further provides a system for transmitting information bits, which includes a terminal and a base station in communication with the terminal, in which, the terminal is configured to divide the information bits to be transmitted into at least two groups, encode the information bits to be transmitted in each group, modulate the encoded coded bits to obtain modulation symbols, in which each modulation symbol is obtained by using the modulation of the coded bits in the same group, and map and transmit the modulation symbols to the base station; and the base station is configured to receive the modulation symbols transmitted by the terminal, and demodulate and decode the modulation symbols to obtain the information bits to be transmitted.

It is clear to persons skilled in the art that the present invention may be accomplished through software plus a necessary universal hardware platform. Based on this, the above technical solutions or the part that makes contributions to the prior art can be substantially embodied in the form of a software product. The computer software product may be stored in a storage medium such as a read-only memory (ROM)/random-access memory(RAM), a magnetic disk, or an optical disk, and contain several instructions to instruct computer equipment (for example, a personal computer, a server, or network equipment) to perform the methods described in the embodiments of the present invention or in some parts of the embodiments of the present invention.

The above descriptions are merely specific embodiments of the present invention, but not intended to limit the protection scope of the present invention. Any variations or replacements that can be easily thought of by persons skilled in the art within the technical scope of the present invention shall fall within the protection scope of the present invention as defined by the appended claims.

What is claimed is:

1. A non-transitory computer-readable storage medium comprising instructions that when executed by a computer, cause the computer to carry out steps of:

receiving a modulation symbol sequence comprising a plurality of modulation symbols;

obtaining modulation symbols of a first group and modulation symbols of a second group from the modulation symbol sequence, wherein the modulation symbols of the first group are discontinuously distributed in the modulation symbol sequence, the modulation symbols of the second group are discontinuously distributed in the modulation symbol sequence, and the plurality of modulation symbols in the modulation symbol sequence are alternately arranged into the first group and the second group;

demodulating the modulation symbols of the first group to obtain coded bits of the first group and demodulating the modulation symbols of the second group to obtain coded bits of the second group; and decoding the coded bits of the first group to obtain control information bits of the first group and decode the coded bits of the second group to obtain control information bits of the second group.

2. The non-transitory computer-readable storage medium according to claim 1, wherein the coded bits of the first group and the coded bits of the second group are modulated according to a predetermined modulation manner.

3. The non-transitory computer-readable storage medium according to claim 2, wherein the predetermined modulation manner comprises one of Quaternary Phase Shift Keying (QPSK) modulation or 16-Quadrature Amplitude Modulation (16QAM).

4. The non-transitory computer-readable storage medium according to claim 1, wherein one or both of the control information bits of the first group or the control information bits of the second group includes uplink control information bits, the uplink control information bits comprise at least one of: a Channel Quality Indicator (CQI), a Precoding Matrix Index (PMI), a Rank Indicator (RI), an Acknowledged/non-acknowledged (ACK/NACK) information, or a Scheduling Request Indicator (SRI).

5. A non-transitory computer-readable storage medium comprising instructions that when executed by a computer, cause the computer to carry out steps of:

receiving a modulation symbol sequence;

demodulating the modulation symbol sequence to obtain a coded bits sequence, wherein each modulation symbol in the modulation symbol sequence is demodulated as N coded bits, every N coded bits in the coded bits sequence belongs to a coded bits sub-group, and N equals 2 or 4;

obtaining coded bits sub-groups of a first group and coded bits sub-groups of a second group from the coded bits sequence, wherein the coded bits sub-groups of the first group are discontinuously distributed in the coded bits sequence, the coded bits sub-groups of the second group are discontinuously distributed in the coded bits sequence, and all coded bits sub-groups in the coded bits sequence are alternately arranged into the first group and the second group; and decoding the coded bits sub-groups of the first group to obtain control information bits of the first group and decode the coded bits sub-groups of the second group to obtain control information bits of the second group.

6. The non-transitory computer-readable storage medium according to claim 5, wherein the coded bits of the first group and the coded bits of the second group are modulated according to a predetermined modulation manner.

7. The non-transitory computer-readable storage medium according to claim 6, wherein the predetermined modulation manner comprises one of Quaternary Phase Shift Keying (QPSK) modulation or 16-Quadrature Amplitude Modulation (16QAM).

8. The non-transitory computer-readable storage medium according to claim 5, wherein one or both of the control information bits of the first group and the control information bits of the second group includes uplink control information bits, and the uplink control information bits comprise at least one of: a Channel Quality Indicator (CQI), a Precoding Matrix Index (PMI), a Rank Indicator (RI), an Acknowledged/non-acknowledged (ACK/NACK) information, or a Scheduling Request Indicator (SRI).

9. A terminal, comprising:

a storage medium including executable instructions; and a processor in communication with the storage medium, wherein the processor executes the instructions to:

encode uplink control information bits in a first group to obtain coded bits of the first group and encode uplink control information bits in the second group to obtain coded bits of the second group;

modulate the coded bits of the first group to obtain modulation symbols of the first group, and modulate the coded bits of the second group to obtain modulation symbols of the second group;

generate a modulation symbol sequence comprising the modulation symbols of the first group and the modulation symbols of the second group by alternately ordering one modulation symbol of the first group and one modulation symbol of the second group, wherein the modulation symbols in the first group and the modulation symbols in the second group are discontinuously distributed in the modulation symbol sequence; and transmit the modulation symbol sequence.

10. The terminal according to claim 9, wherein the coded bits of the first group and the coded bits of the second group are modulated according to a predetermined modulation manner.

11. The terminal according to claim 10, wherein the predetermined modulation manner comprises one of Quaternary Phase Shift Keying (QPSK) modulation or 16-Quadrature Amplitude Modulation (16QAM).

12. The terminal according to claim 9, wherein the uplink control information bits in the first group and the uplink control information bits in the second group comprise at least one of: a Channel Quality Indicator (CQI), a Precoding Matrix Index (PMI), a Rank Indicator (RI), an Acknowledged/non-acknowledged (ACK/NACK) information, or a Scheduling Request Indicator (SRI).

* * * * *